Nov. 10, 1936.   A. D. PETTEE   2,060,745
INSULATING JOINT FOR CABLES
Filed Aug. 27, 1931   3 Sheets-Sheet 1

INVENTOR-
Allen D. Pettee.
BY
Emery, Booth, Varney & Whittemore
ATTORNEYS

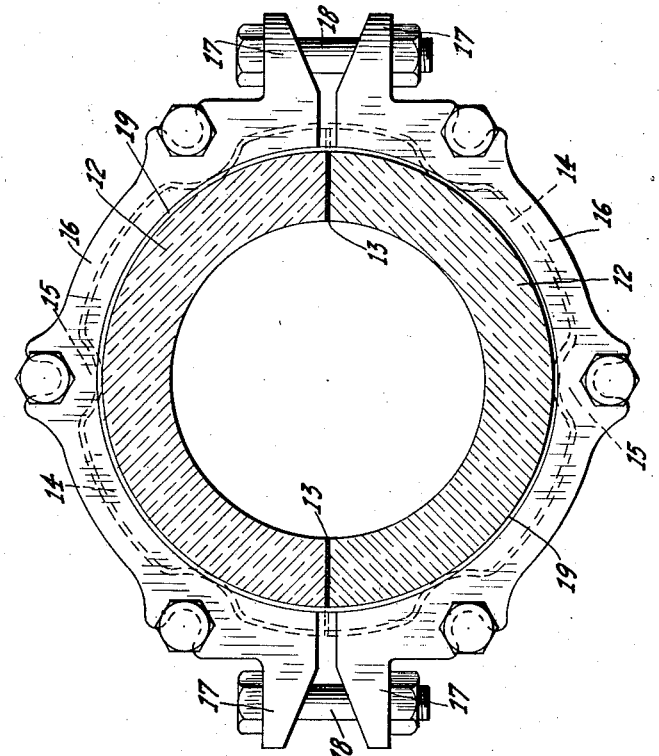
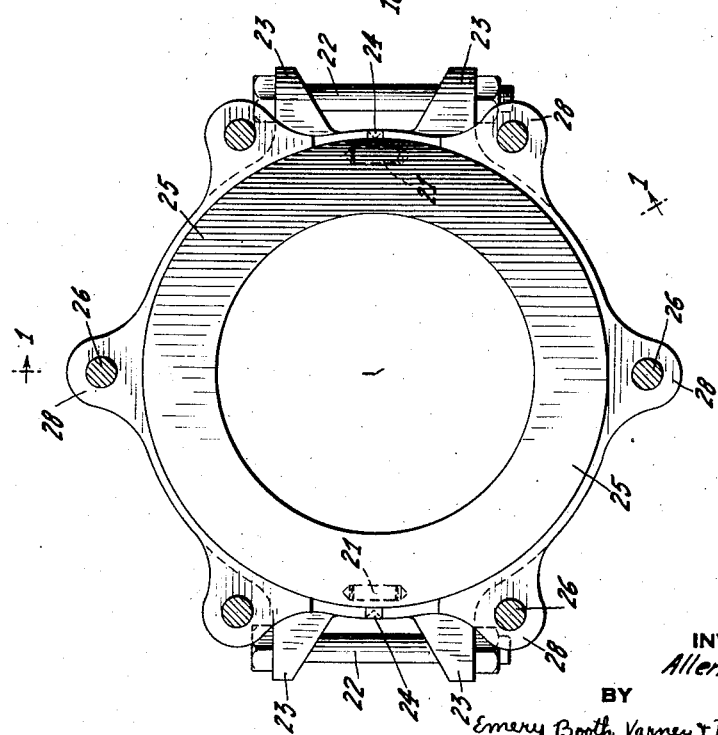

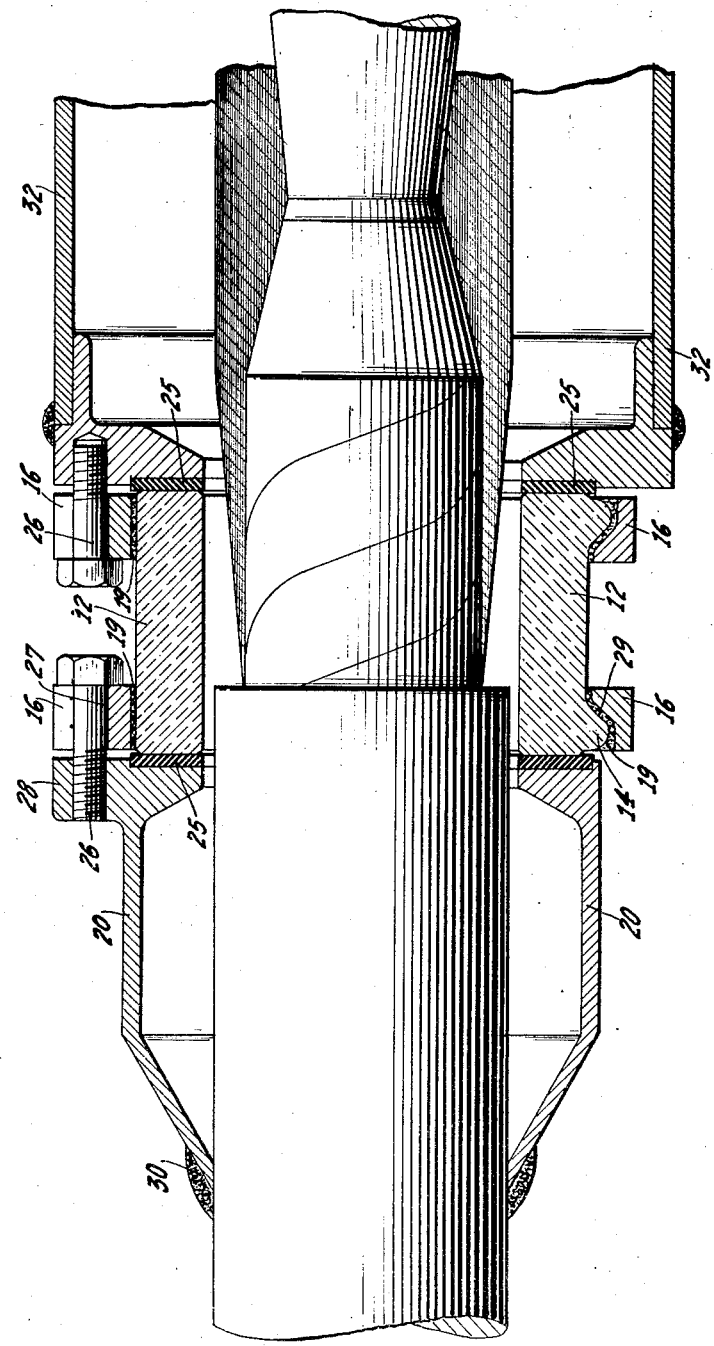

Patented Nov. 10, 1936

2,060,745

UNITED STATES PATENT OFFICE 2,060,745

INSULATING JOINT FOR CABLES

Allen D. Pettee, Plainfield, N. J., assignor to General Cable Corporation, New York, N. Y., a corporation of New Jersey Application August 27, 1931, Serial No. 559,669

4 Claims. (Cl. 173—268)

This invention relates to electrical cable joints, and in particular relates to an insulating joint for the sheath of an electrical cable.

Heretofore it has been a practice to interrupt the continuity of the metallic sheath of cables installed for certain purposes in order to divide the sheath into a number of shorter sections and in this manner to avoid the passage of undesired stray or parasitic electrical currents along the cable sheath. This has been accomplished by installing an insulating joint or ring between spaced sections of the sheath at the joints of the cable when the cable joints were made. For this purpose it has been possible to use complete integral insulating rings since these could be slipped over the end or ends of the cable sections before the joint was made.

But with integral circular rings of this kind it is impossible to provide insulation between cable joints in new installations or at the cable joints in old installations without disconnecting and remaking a joint. An insulator made according to the present invention, however, can be installed at any time and at any point along the cable without cutting the cable or opening a joint.

In order to furnish an understanding of the nature and mode of application of the invention, the same will now be described in connection with an illustrative embodiment thereof as shown in the accompanying drawings, in which:

Fig. 2 is a transverse section taken on the line 2—2 of Fig. 1;

Fig. 3 is a transverse section taken on the line 3—3 of Fig. 1; and

Fig. 4 is a partial section of a slightly modified form of joint adapted to cooperate with one end of a cable joint sleeve.

Figure 1:
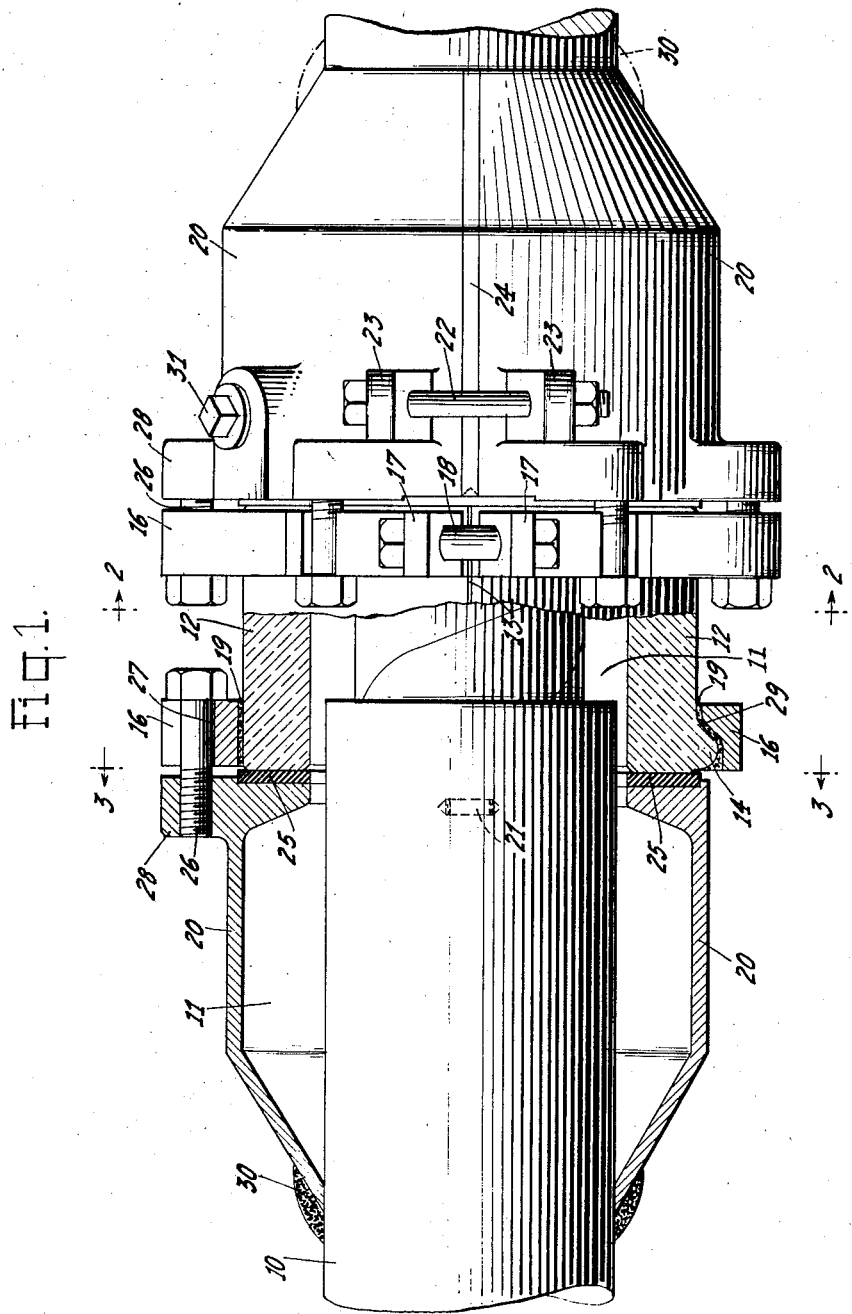
Fig. 1 is a side elevation, partly in section of the joint applied to a cable.

Referring to Figs. 1 to 3, the cable sheath 10, usually of lead, is provided with a gap 11 to break the electrical continuity of the sheath and at this point the cable must be protected by other means of such nature as to keep the spaced ends of the metallic sheath electrically isolated from each other.

The form of insulating means herein illustrated comprises a glazed porcelain ring formed in two halves 12, 12 and provided at their mating longitudinal surfaces—which are ground smooth—with an insulating gasket 13 to enclose an insulating compound which fills the joint when completed. The porcelain ring 12 at its ends is provided with shoulders 14, which extend about the entire circumference of the ring except where they are interrupted at intervals by gaps 15.

The halves of the insulating ring are clamped together by split clamp rings 16, 16, which are formed with apertured lugs 17 through which they are connected by bolts 18. Between the porcelain ring 12 and the split rings 16 there are placed gaskets 19 for cushioning the parts and protecting the glaze on the porcelain from injury by the metal rings.

The split porcelain ring is ground smooth at each end to face a nipple 20. The nipples are likewise formed in two longitudinally divided parts which are aligned for proper assembly by dowels 21 and are clamped together by bolts 22 engaging apertured lugs 23 formed on the mating parts of the nipples. The parts of the nipples are made liquid and gas tight when clamped together in any suitable manner, as by welding or soldering, and for this purpose the parts are formed with mating bevelled edges which together form grooves 24 for receiving the solder or welding material. This material may then be wiped off smooth with the surfaces of the nipples.

The nipples are now moved up against the ends of the insulating ring—there being scarf-split packing 25 placed between the mating ends—and are pulled tightly there-against by cap bolts 26 which pass through apertures 27 in the rings 16 and are threaded into holes in lugs 28 formed on the nipples 20. As the parts are being pulled up by the bolts 26, the rings 16 ride up on the inclined surfaces 29 of the shoulders 14 of the porcelain ring 12 and pull the parts thereof still more tightly together. The packing 25 is pressed tightly against the flush cut ends of gasket 13 as well as against the ends of the insulating ring, thus making this joint completely oil and gas tight.

After the joint has been assembled in the manner indicated above it may be slipped to proper position longitudinally of the cable and there secured and sealed to the sheath as by making wiped joints 30 between the ends of the nipples 20 and the cable sheath.

One or more filling openings closed by a cap 31 may be provided in the metal nipples 20 for introducing insulating compound into the joint.

In the form shown in Fig. 4 one nipple is connected to the cable sheath, as before, and the other nipple is modified to fit with the enlarged joint sleeve 32. The joint sleeve is shown as fitting over the end of the modified nipple but the nipple may be fitted over the joint sleeve, if desired, just as in the previous form it was fitted over the cable sheath. With this form the steps of assembling may be performed in the same way as that described for the form of Figs. 1 to 3. It will usually not be necessary to place an insulating joint at each end of the metallic joint sleeve but this may be done if desired.

While one embodiment of the invention and a slight modification thereof have been described in detail for purposes of illustration, it is to be understood that various changes and modifications may be made within the scope of the subjoined claims.

What I claim is:—

1. An insulating joint for cable sheaths, comprising in combination, a split insulating ring, gaskets between the parts of said ring, shoulders formed on the ends of said ring, gaskets on said shoulders, a split clamping ring clamped over the gasket upon each of said shoulders, split nipples at the ends of said insulating ring, said nipple parts being dowelled and soldered together, split gaskets between the ends of said insulating ring and said nipples, and means for clamping said insulating ring and said nipples together upon said gaskets, said clamping means comprising bolts acting upon said nipples and upon the clamping rings secured upon the end shoulders of said insulating rings, said nipples at the outer ends being sealed and secured to the cable sheath on each side of a gap therein, and the entire joint being filled with insulating compound.

2. An insulating joint for cable sheaths, comprising in combination, a split insulating ring spaced from the cable sheath, split nipples secured together at the ends of said ring, a split clamp ring fitting on shoulders at each end of said insulating ring, means engaging said clamp rings and said nipples for securing the insulating ring against said nipples at each end, said nipples being sealed to the cable sheath on opposite sides of a gap therein, and means to pass insulating compound into and seal it within the sealed space between said joint and the cable.

3. A cable having a metallic sheath, the continuity of which is interrupted, in combination with an insulator which spans the interrupted part of the sheath and comprises a pair of axially split end members having opposed flanges, soldered joints uniting the outer ends of the members to the sheaths, other soldered joints uniting the parts of each member and preventing escape of liquid, a split ring insulator having end flanges and clamping lugs, located between the flanges of the members, axially extending gaskets between the parts of the ring, bolts located in the lugs for clamping the parts of the ring insulator with the gaskets between, annular gaskets located between the ends of the ring insulator and the metal members and engaging the axially extending gaskets, and axially extending bolts for clamping the flanges of the insulator to those of the metal members with the annular gaskets between them.

4. An insulating joint for cable sheaths comprising, in combination, a longitudinally split insulating sleeve, gaskets separating the adjacent edges of the sleeve parts, split clamp rings securing the sleeve parts together with the gaskets therebetween, a longitudinally split nipple at each end of said insulating sleeve, means securing the nipple parts together, annular gaskets separating said insulating sleeve and the nipples, and means for clamping the insulating sleeve and the nipples together with the annular gaskets therebetween.

ALLEN D. PETTEE.